March 24, 1953     H. L. PRESCOTT     2,632,879
REGULATING SYSTEM
Filed Aug. 19, 1950     4 Sheets-Sheet 1

Fig.1.

WITNESSES:
INVENTOR
Herbert L. Prescott.
BY
James N. Ely
ATTORNEY

March 24, 1953     H. L. PRESCOTT     2,632,879
REGULATING SYSTEM Filed Aug. 19, 1950     4 Sheets—Sheet 2

Fig.2.

WITNESSES:

INVENTOR
Herbert L. Prescott.
BY
James N. Ely
ATTORNEY

Fig.3.

March 24, 1953   H. L. PRESCOTT   2,632,879
REGULATING SYSTEM
Filed Aug. 19, 1950   4 Sheets-Sheet 4

Fig.4.

WITNESSES:
INVENTOR
Herbert L. Prescott.
BY
James N. Ely
ATTORNEY

Patented Mar. 24, 1953

2,632,879

UNITED STATES PATENT OFFICE 2,632,879

REGULATING SYSTEM

Herbert L. Prescott, Sharon, Pa., assignor to Westinghouse Electric Corporation, East Pittsburgh, Pa., a corporation of Pennsylvania Application August 19, 1950, Serial No. 180,409

4 Claims. (Cl. 323—43.5)

This invention relates to electrical regulating systems, and in particular to regulating systems utilizing a plurality of step type regulators connected in parallel circuit relation for supplying a common load.

Where a plurality of tap changing regulating transformers are connected in parallel relation for supplying a common load, it is desirable that such regulators be kept in step in order that circulating current between the different tap changers will not cause excessive heating and reduce the output capacity of the regulating transformers. Different systems have been developed heretofore in attempts to keep the regulators in step but they have had different operating disadvantages. For example, one known system initiates the operation of all of the tap changing regulators simultaneously but if one unit gets out of step, all of the units are locked out requiring the attention of an operator to restore the units to operation.

An object of this invention is to provide, in a regulating system utilizing a plurality of step type regulators connected for parallel operation, for so controlling the sequence of operation that the regulators are maintained not more than one step apart during automatic regulating operations.

Another object of this invention is to provide, in a regulating system utilizing a plurality of step type regulators connected for parallel operation, for so interconnecting the controls of the different regulators as to render one a master unit and the others follower units and to maintain the regulators not more than one step apart during automatic regulating operations.

A further object of this invention is to provide, in a regulating system utilizing a plurality of step type regulators connected for parallel operation, means for selecting one of the regulators as a master unit and the others as follower units and of means for effecting a positive lockout to maintain the regulators not more than one step apart during automatic regulating operations.

A more specific object of this invention is to provide, in a regulating system utilizing a plurality of step type regulators connected for parallel operation, means for selecting one of the regulators as a master unit and the others as follower units with means for effecting a positive lockout to maintain the regulators not more than one step apart during automatic regulating operations and means for cooperating with the selective means for effecting a manual control of any one of the regulators without affecting the automatic control of the other regulators.

Other objects of this invention will become apparent from the following description when taken in conjunction with the accompanying drawings, in which:

Figures 1, 2, 3 and 4 form a composite drawing when

Figure 1:
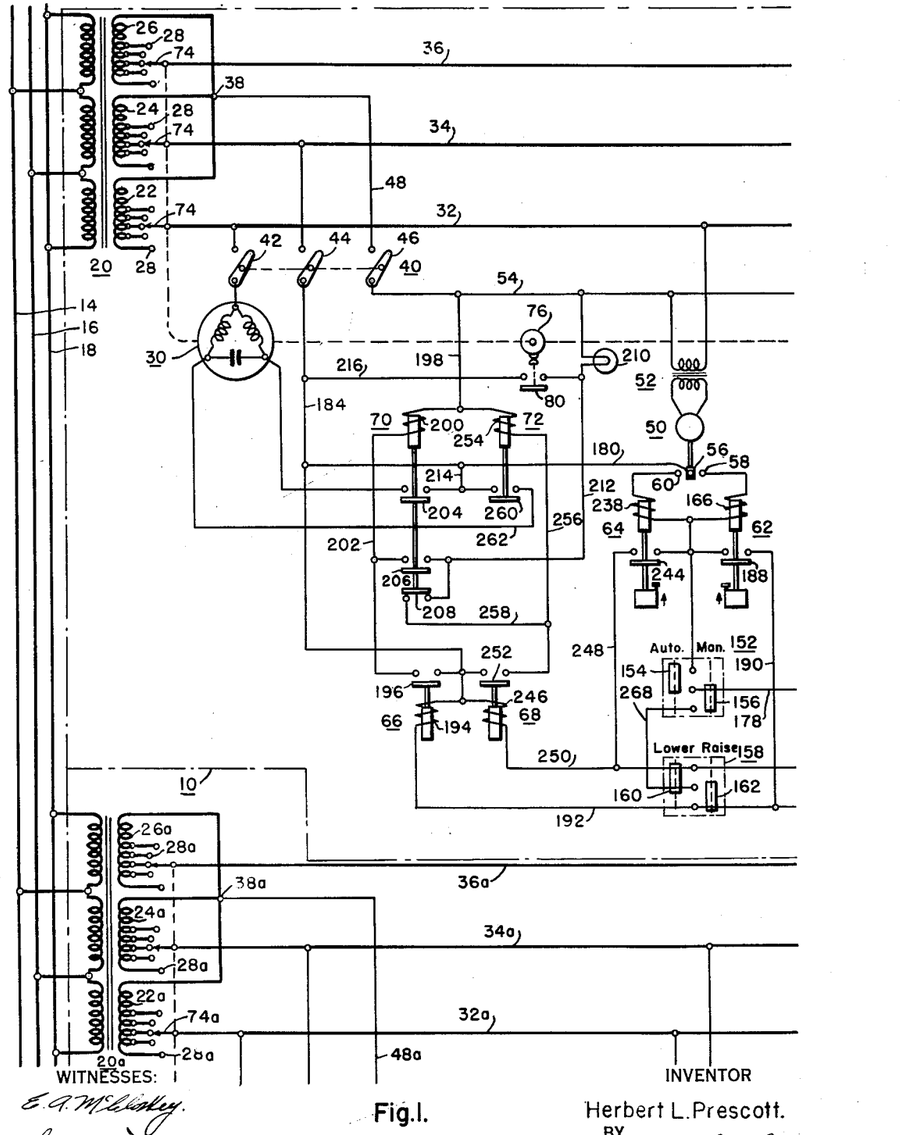
Figs. 1 and 2 are disposed side by side and Figs. 3 and 4 are disposed side by side with their upper edges butting the lower edges of Figs. 1 and 2, respectively, the composite drawing illustrating diagrammatically the circuits and apparatus embodying the teachings of this invention.
Figure 2:
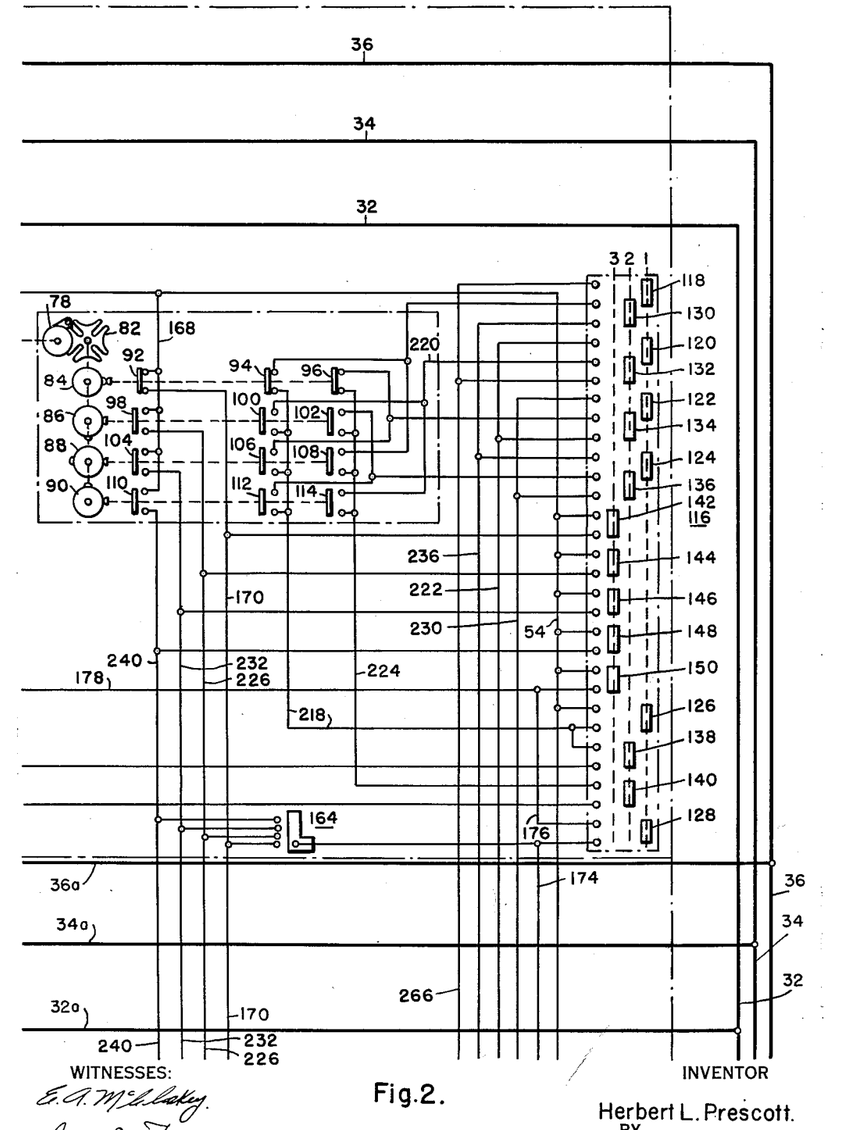
Figure 3:
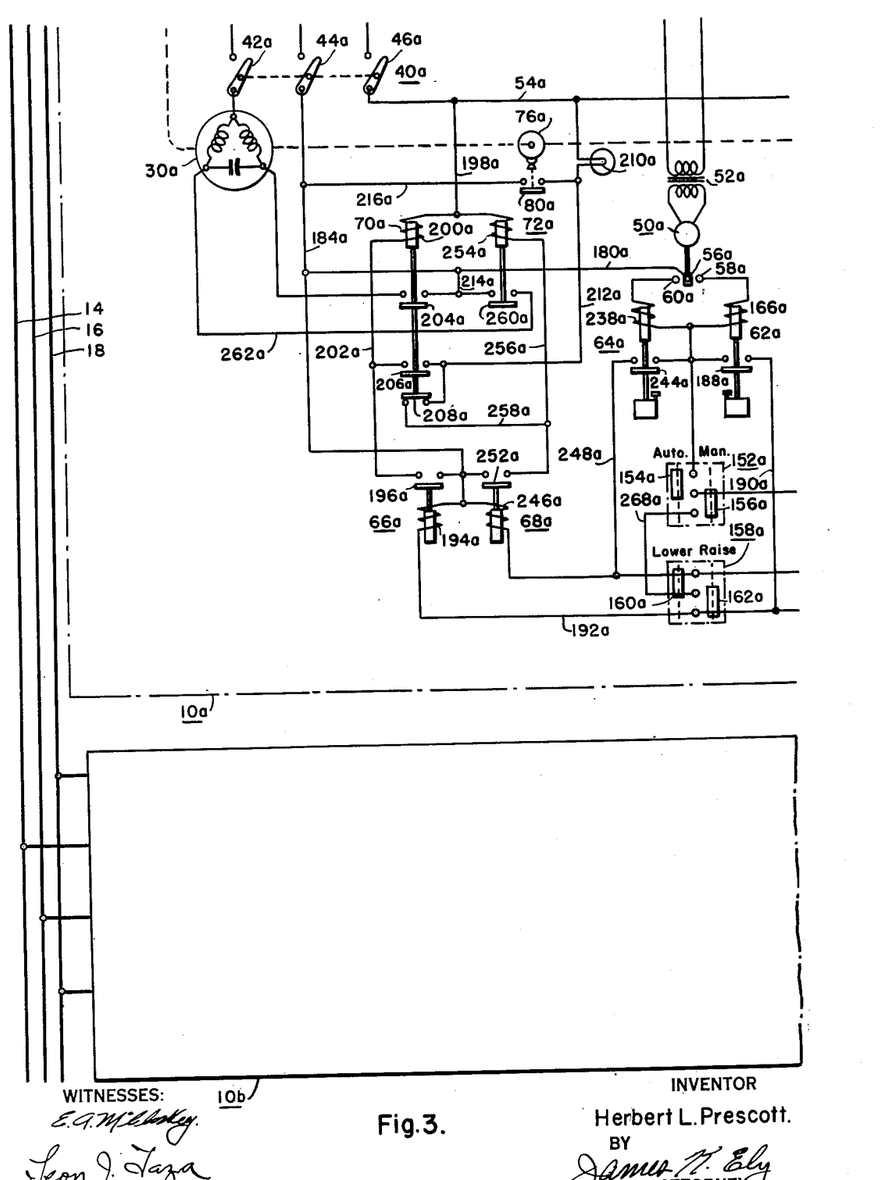
Figure 4:
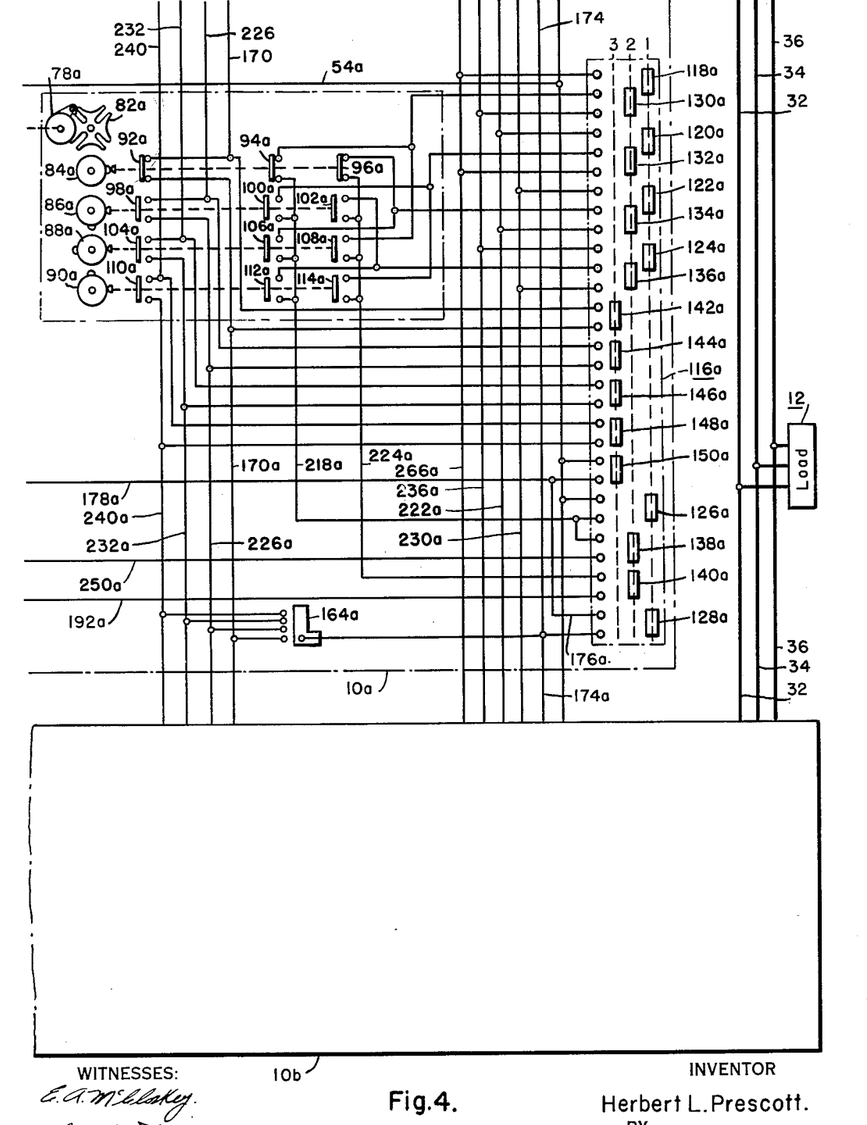

Referring to the composite drawing, there is represented three regulating units 10, 10a and 10b, each of the units being illustrated in block form and connected in parallel relation for supplying a common load 12 from a three-phase alternating-current power system represented by the conductors 14, 16 and 18. Each of the units 10, 10a and 10b is substantially identical as to components, units 10 and 10a being illustrated in detail, whereas unit 10b is merely illustrated in block representation only. For the purpose of simplifying the description of the components comprising the entire system, the components of unit 10 only will be described in detail, it being understood that like components of unit 10a will be similarly identified by the same number with the suffix "a" appended thereto. Likewise, if the components of unit 10b were to be shown, they would be similarly identified by the same number with the suffix "b" appended thereto.

Each of the units includes a tap changing regulating transformer or regulator 20 having the primary windings thereof connected to be supplied from the conductors 14, 16 and 18. The secondary windings 22, 24 and 26 of the tap changing transformer are each provided with a plurality of taps 28 disposed to be selectively engaged by a movable contact member 74 positioned in response to operation of a suitable motor operating mechanism represented by the motor 30. As illustrated, the secondary windings of the transformer 20 are connected by conductors 32, 34 and 36 to supply the load 12, the secondary windings being provided with a neutral point 38. The motor operating or control system for the motor 30 is disposed to be connected by a three-pole switch 40 having the switching members 42, 44 and 46 thereof for engaging fixed contact members to connect the control system to conductors 32, 34 and a neutral conductor 48 which is connected to the neutral point 38 of the secondary windings of the tap changing regulator.

In order to control the operation of the motor 30 in response to a deviation of the quantity which is to be regulated, a primary relay 50 is illustrated as being connected through a potential transformer 52 across the load conductor 32 and a neutral conductor 54 which is disposed to be connected by the switch 46 to the conductor 48, whereby the primary relay 50 will be energized to actuate its movable contact member 56 into engagement with contact members 58 or 60 depending upon the direction of the deviation. The primary relay 50 thus is disposed to initiate the control of the operation of the motor 30 in one or the other directions by energizing one or the other of time delay or selective relays 62 or 64 which, in turn, control secondary relays 66 and 68, respectively, the secondary relays being disposed to control the operation of motor controlling relays 70 and 72, respectively, as will be described more fully hereinafter.

The motor 30 is connected through a suitable gear drive (not shown) to operate the switch contact members 74 for simultaneously engaging corresponding contact members 28 of the secondary windings 22, 24 and 26 and simultaneously with a movement of the contact members 74 one step to drive a pair of cam members 76 and 78 one revolution for each step of the movable switch contact members 74. The cams 76 and 78 are disposed to control predetermined switching operations. Thus the cam 76, when the movable switch contact members 74 are in engagement with corresponding contact members 28 of the secondary windings, maintains a cooperating contact member 80 in a circuit interrupting position. Upon movement of the motor 30, and consequently the cam 76, the contact member 80 is actuated to a circuit closing position during the revolution of the cam 76.

The cam 78 as illustrated is disposed to drive a Geneva gear 82, ¼ of a revolution for each revolution of the cam 78, to actuate a series of cam members 84, 86, 88 and 90, ¼ of a revolution to control the switching operation of sets of contact members associated therewith. Thus the movement of the cam member 84 controls the switching operation of contact members 92, 94 and 96, cam 86 controls the switching operation of contact members 98, 100 and 102, cam 88 controls the switching operations of contact members 104, 106 and 108, and cam 90 controls the switching operations of contact members 110, 112 and 114, the purpose of which will be more fully explained hereinafter.

Associated with each of the control mechanisms is a master controller 116 having three sets of contact members disposed thereon in the positions indicated respectively 1, 2 and 3 for engaging cooperating fixed contact members positioned relatively thereto. The position 1 of the controller 116 is provided with contact members 118, 120, 122, 124, 126 and 128 in alignment thereon for engaging cooperating fixed contact members when it is desired to have the controlling unit associated therewith as the master unit where a plurality of the units are to be operated in parallel. The position 2 has a plurality of contact members 130, 132, 134, 136, 138 and 140 in alignment therewith for engaging fixed cooperating contact members when it is desired to have the control mechanism of the unit associated therewith operate as a follower unit. On the other hand, the position 3 is provided with contact members 142, 144, 146, 148 and 150 for engaging fixed cooperating contact members when it is desired to operate the control mechanism of the associated unit independently of the other tap changing regulators which are connected in parallel to supply the load 12. The master controller 116 is disposed, as illustrated, to cooperate with the contact members actuated in response to a movement of the Geneva gear 82 to control the sequence of operation of the regulating units, as will be described more fully hereinafter.

In order to condition the control system for automatic operation or manual operation, a controller 152 having a pair of contact members 154 and 156 is associated with the time delay relays 62 and 64 and disposed for manual operation, whereby the contact members 154 and 156 engage fixed cooperating contact members for establishing circuits for either automatic operation or manual operation. When the controller 152 is moved so that its contact member 156 engages its cooperating fixed contact members, manual control of the energization of the secondary relays 66 and 68 may be effected by means of another controller 158 having contact members 160 and 162 thereon for engaging fixed cooperating contact members to selectively control the energization of the relays 66 and 68.

An auxiliary switch 164 and 164a is illustrated for each of the units 10 and 10a, it being understood that a similar switch 164b (not shown) will be utilized in the unit 10b to provide a complete circuit for the parallel connected units when the switch of the last unit is in the circuit closing position, as will be described more fully hereinafter. The auxiliary switch 164 and 164a will not be utilized as long as the unit 10b is the last of the follower units of the parallel connected systems being controlled. However, if unit 10a is rendered the last unit of the follower system and unit 10 is rendered the master unit, as will be described hereinafter, then the switch 164a will be manually operated to its circuit closing position to provide a closed circuit. In actual practice, where two or more units are to be connected for sequential operation, the switches 164, 164a, etc. may be omitted and a permanent connection substituted therefor in the last unit, as for example, in unit 10b where three units are connected for sequential operation or where unit 10 or 10a is disposed for independent operation.

For the purpose of simplifying the explanation of the operation of the regulating system of this invention, it will be considered that only two units 10 and 10a are connected for parallel operation, although it will be understood that unit 10b and additional units could be added, and that the sequence of operation of 10b and any other additional units will be the same as that which is to be described for unit 10a. With the switches 40 and 40a moved to circuit closing positions and with the master controller 116 of the unit 10 positioned whereby the contact members of position 1 engage the cooperating fixed contact members, the unit 10 is established as a master unit. The master controller 116a of the unit 10a is then positioned whereby the contact members in the position 2 will engage the cooperating fixed contact members and the switch 164a will be moved to a circuit closing position, whereby the unit 10a is established as a follower unit to follow the operation of the control for unit 10. Likewise, the controller 152 of unit 10 is actuated so that its contact member 154 engages its cooperating fixed contact members to condition the systems of both units for automatic operation.

Assume that the tap changing regulators 20 and 20a are in step for supplying a load 12 and that for some reason the load 12 changes with the result that the quantity which is to be regulated changes. Thus, for example, if the voltage of the system is to be maintained and the voltage should decrease, then the primary relay 50 of unit 10 senses the change or deviation of the quantity to be regulated and is so energized that its movable contact member 56 engages the fixed contact member 58 to establish an energizing circuit for the energizing winding 166 of the relay 62. This circuit may be traced from the neutral conductor 54 through conductor 168, contact member 92, conductor 170, contact member 92a of the unit 10a, conductor 170a, the shorting switch 164a, conductor 174, contact member 128 of the master controller 116, conductors 176 and 178 through the contact member 154 of the controller 152, energizing winding 166 of the time delay relay 62, contact members 58 and 56 of the primary relay 50 and conductors 180 and 184 to the closed switch 44 and the load conductor 34.

When the time delay relay 62 is thus energized, if the deviation is maintained for a predetermined period of time, the time delay relay 62 is actuated so that its contact member 188 establishes an energizing circuit for the secondary relay 66. This circuit extends from the contact member 154 of controller 152 through the contact member 188 of time delay relay 62, conductors 190 and 192, the energizing winding 194 of the secondary relay 66 and conductor 184 to the closed switch 44. When the secondary relay 66 is thus energized, its movable contact member 196 is actuated to a circuit closing position to establish an energizing circuit for the motor control relay 70 which extends from the neutral conductor 54 through conductor 198, the energizing winding 200 of the motor control relay 70, conductor 202, the contact member 196 of the secondary relay 66 and conductor 184 to the closed switch 44.

When the motor control relay 70 is thus energized, its contact members 204 and 206 are actuated to circuit closing positions and its contact member 208 is actuated to a circuit interrupting position. When the contact member 206 is thus actuated to its circuit closing position, a signal lamp 210 is lighted, the contact member 206 establishing a signaling circuit extending from the neutral conductor 54 through the lamp 210, conductor 212, contact member 206 of the motor control relay 70, conductor 202, contact member 196 of the secondary relay and conductor 184 to the closed switch 44. At the same time, the contact member 204 of the motor control relay 70 closes and establishes a circuit to effect operation of the motor 30, which circuit extends from the load conductor 34 through the closed switch 44, conductors 184, 180 and 214, contact member 204 of the motor control relay 70, one of the windings of the motor 30, closed switch 42 to the load conductor 32, whereby the motor is so energized as to effect an operation of the tap changing switch contact members 74 in a direction to so change the connection to the taps 28 as to effect an increase in the voltage across the load conductors 32, 34 and 36.

When the motor 30 is thus energized, as soon as it starts to operate, cams 76 and 78 are operated to effect switching operations. Thus cam 76 is moved sufficiently to permit the contact member 80 associated therewith to move to a circuit closing position to establish a holding circuit for the motor control relay 70 to insure a one-step operation of the motor 30 even though the primary relay 50 is deenergized during the movement of the tap changing switching contact members 74. This holding circuit extends from the neutral conductor 54 through conductor 198, energizing winding 200 of the relay 70, conductor 202, contact member 206 of the relay 70, conductor 212, contact member 80 associated with the cam 76 and conductors 216 and 184 to the closed switch 44.

At the same time, the Geneva gear 82 is driven to effect a 90° turn of the cams 84, 86, 88 and 90, whereby the contact members 92, 94 and 96 associated with the cam 84 are moved to circuit interrupting positions and contact members 98, 100 and 102 associated with the cam 86 are moved to circuit closing positions. In practice, the cams 84, 86, 88 and 90 are of a size and shape with respect to the cam 76, that the contact 80 moves to a circuit closing position before operation of the contact members associated with cams 84, 86, 88 and 90 is effected. The movement of the contact member 92 interrupts the energizing circuit for the winding 194 of the secondary relay 66, whereby the secondary relay 66 is deenergized and, upon completion of the movement of the cam 76 representing a one-step operation of the tap changing switch contact members 74, the holding circuit for the motor control relay 70 is interrupted and the motor 30 is no longer energized to effect further operation of the tap changing switch contact members 74.

When the contact members 98, 100 and 102 of the unit 10 are actuated to circuit closing positions through the operation of the cam 86, an energizing circuit is established for the secondary relay 66a of the unit 10a to initiate operation of the motor 30a. This energizing circuit may be traced as extending from the neutral conductor 54 of the unit 10 through the contact member 126 of the master controller 116, conductor 218, contact member 100, conductor 220, contact member 120 of the controller 116, conductor 222, contact member 134a of the master controller 116a, the closed contact member 96a, conductor 224a, contact member 140a of the controller 116a and conductor 192a to the energizing winding 194a of the secondary relay 66a, conductor 184a and closed switch 44a to the load conductor 34a.

When such a circuit is energized, the secondary relay 66a is so energized that its contact member 196a is moved to a circuit closing position to establish an energizing circuit for the motor control relay 70a. This circuit extends from the neutral conductor 54a through conductor 198a, energizing winding 200a of the motor control relay 70a, conductor 202a, contact member 196a of the secondary relay 66a and conductor 184a to the closed switch 44a.

When the motor control relay 70a is thus energized, its contact members 204a and 206a are actuated to a circuit closing position and the contact member 208a thereof is actuated to a circuit interrupting position. The movement of contact member 206a establishes the signal light circuit for lamp 210a in the same manner as closing the contact member 206 of the motor control relay 70 of unit 10 establishes the signaling circuit. At the same time, the contact member 204a establishes the motor energizing circuit which extends from the closed switch 44a through conductors 184a and 214a, contact member 204a of the motor control relay 70a, a winding of the motor 30a through closed switch 42a to the load conductor 32a. When the motor 30a is thus energized, it effects the operation of the tap changing contact members 74a from one of the taps 28 to an adjacent tap in a direction to effect an increase in the voltage across the load conductors 32a, 34a and 36a.

The movement of the motor 30a also effects a simultaneous movement of the cams 76a and 78a, whereby a holding circuit is established for the energizing winding 200a of the motor control relay 70a to maintain the motor energized to effect a one-step movement of the tap changing contact members 74a regardless of whether or not the secondary relay is maintained energized. This holding circuit extends from the neutral conductor 54a through conductor 198a, energizing winding 200a of the motor control relay 70a, conductor 202a, contact member 206a, conductor 212a, contact member 80a and conductors 216a and 184a to the closed switch 44a.

At the same time that the cam 76a is actuated, the cam 78a is also actuated to effect a 90° movement of the Geneva gear 82a with the result that the cams 84a, 86a, 88a and 90a are moved 90° to effect a switching movement of the contact members associated therewith. Thus as cam 84a is moved 90°, the contact members 92a, 94a and 96a are actuated to circuit interrupting positions and substantially simultaneously therewith contact members 98a, 100a and 102a associated with the cam 86a are actuated to circuit closing positions. As is evident from the drawing the cam 84a permits movement of contact member 92a to an open circuit position prior to the actual actuation of contact member 98a by the cam 86a to a circuit closing position.

The movement of the contact member 96a associated with the cam 84a to the circuit interrupting position interrupts the energizing circuit of the secondary relay 66a with the result that after the motor 30a has operated sufficiently to effect a one-step change in the positioning of the tap changing contact members 74a and the cam 76a is operated one revolution to effect a circuit interrupting operation of the contact member 80a to interrupt the holding circuit for the motor control relay 70a, that the control circuit for the motor 30a is interrupted and no further movement of the tap changing contact members 74a can be effected until after the master control unit has operated to effect a further step operation of the tap changing switch contact members 74 associated with the master unit 10.

If the primary relay 50 of the master unit 10 continues to be energized so as to demand a change in the setting of the regulator 20 to effect a further increase in the voltage across the load conductors 32, 34 and 36, the time delay relay 62 is further energized by a similar circuit described hereinbefore. In this instance, the energizing circuit for the winding 166 of the time delay relay 62 extends from the neutral conductor 54 through conductor 168, closed contact member 98 associated with the cam 86, conductor 226, closed contact member 98a associated with the cam 86a, conductor 226a, the closed switch 164a and from thence through the identical circuit previously described for effecting energization of the winding 166 of the time delay relay 62. When the time delay relay 62 is thus energized and its contact member 188 is in circuit closing position, an energizing circuit for the winding 194 of the secondary relay 66 is established, as described hereinbefore, with the exception that the circuit extends through the contact member 98, conductor 226, contact member 98a and conductor 226a to the closed switch 164a.

When the secondary relay 66 is thus again energized, the motor control relay 70 is energized as described hereinbefore, to establish the energizing circuit for the motor 30 to effect an operation of the tap changing contact members 74 and at the same time establishing a holding circuit for the winding 200 of the motor control relay to insure a one-step operation of the tap changing contact members 74. At the same time that the cam 76 is actuated to provide the holding circuit for the motor control relay 70, the Geneva gear 82 is again actuated to effect a 90° turning operation of the cams 84, 86, 88 and 90, whereby the contact members 98, 100 and 102 are actuated to circuit interrupting positions and the contact members 104, 106 and 108 are actuated to circuit closing positions.

Since the contact member 98 is now in the circuit interrupting position, it is impossible to establish the energizing circuit for the time delay relay 62 or the energizing circuit for the secondary relay 66. However, since the contact member 106 associated with cam 88 is now in the circuit closing position, a circuit is established extending from the neutral conductor 54 through the contact member 126 of controller 116, conductor 218, contact member 106 associated with cam 88, contact member 122 of the master controller 116, conductor 230, contact member 136a of controller 116a, contact member 102a associated with cam 86a, conductor 224a, contact member 140a of the controller 116a, conductor 192a, energizing winding 194a of the secondary relay 66a and conductor 184a to the closed switch 44a. When the secondary relay 66a is thus energized, it establishes the energizing circuit for the motor control relay 70a which, in turn, operates as described hereinbefore to establish the energizing circuit for the motor 30a to effect an operation thereof to actuate the tap changing contact members 74a from one tap 28a to another tap 28a in a direction to increase the voltage across the load conductors 32a, 34a and 36a. At the same time, the motor 30a functions to drive the cams 76a and 78a to establish a holding circuit described hereinbefore for the motor control relay 70a to insure a one-step operation of the motor 30a, the cam 78a being operated effectively to actuate the Geneva gear 82a to move the cams 84a, 86a, 88a and 90a, 90° whereby the contact members 98a, 100a, 102 are actuated to a circuit interrupting position and the contact members 104a, 106a and 108a are actuated to a circuit closing position.

A similar step operation of the regulators 20 and 20a is obtained if the primary relay 50 is still conditioned to call for an additional change in the setting of tap changing contact members 74 to effect an increase in the voltage across the load conductors 32, 34 and 36. Thus if the movable contact member 56 of the relay 50 is maintained in circuit engaging position with the fixed contact member 58, an energizing circuit for the winding 166 of the time delay relay 62 is established which extends from the neutral conductor 54 through conductor 168, closed contact member 104 associated with the cam 88, conductor 232, closed contact member 104a associated with cam 88a, conductor 232a, the closed switch 164a and from thence through the circuit previously described for effecting energization of the winding 166. The movement of the time delay relay 62 to actuate its contact member 188 to a circuit closing position similarly establishes an energizing circuit for the secondary relay 66 through the contact member 104, conductor 232, contact member 104a, conductor 232a and the closed switch 164a and from thence as described hereinbefore to effectively energize the secondary relay 66 of unit 10 to effect an operation of the motor control relay 70 to establish the energizing circuit for the motor 30 and thus effect a one-step operation of the tap changing contact members 74.

Again the movement of the motor 30 establishes the holding circuit for the energizing winding 200 of the motor control relay, as described hereinbefore, and effects a 90° movement of the Geneva gear 82 to actuate the cams 84, 86, 88 and 90, whereby the contacts 104, 106 and 108 are actuated to their circuit interrupting positions and the contact members 110, 112 and 114 are actuated to their circuit closing positions. The movement of the contact member 104 effectively interrupts the energizing circuits to the time delay relay 62 and the secondary relay 66, whereby when the motor has completed a one-step operation of the tap changing contact members 74, the control system for the motor 30 is effectively deenergized.

At the same time, the contact member 112 establishes a circuit to effect the energization of the secondary relay 66a which circuit extends from the neutral conductor 54 through the contact member 126 of the master controller 116, conductor 218, contact member 112 associated with the cam 90, contact member 124 of the master controller 116 and from thence through conductor 236, contact member 130a of the master controller 116a, closed contact member 108a associated with the cam 88a, conductor 224a, contact member 104a of the controller 116a and from thence through the energizing winding 194a, as described hereinbefore, to effect the energization of the winding 194a of the secondary relay 66a.

When the secondary relay 66a is thus energized, it establishes the energizing circuit for the motor control relay 70a, as described hereinbefore, to establish the energizing circuit for the motor 30a to effect operation thereof to actuate the contact members 74a one step. As previously described, the motor 30a again drives the cams 76a and 78a to establish the holding circuit for the motor control relay 70a and to effect a 90° movement of the cams 84a, 86a, 88a and 90a, whereby the contact members 104a, 106a and 108a are actuated to their circuit interrupting positions and contact members 110a, 112a and 114a are actuated to their circuit closing positions.

If the relay 50 is still energized to initiate a "raise" operation of the motor 30, the Geneva gear 82 is further operated to again drive the associated cams in a direction to open contact members 110, 112 and 114 and close contact members 92, 94 and 96 to initiate circuits to control the step operation of unit 10a in a manner as described hereinbefore. The operation of the system could thus continue in one direction for as many steps as there are contacts 22, etc. associated with the regulators. In practice limit switches (not shown) are provided for limiting the extent of movement or switching operations of the tap changing contact members 74, 74a, etc. in the "raise" and "lower" directions.

Assuming that the motor operating mechanism 30 and 30a has been operated as described, so that the tap changing contact members 74 and 74a are in a position to maintain the voltage on the load conductors, and that the contact members 110, 112 and 114 associated with the cam 90 and contact members 110a, 112a and 114a associated with the cam 90a are in circuit closing positions as just described, if the load should change so that the voltage across the load conductors increases, then the primary relay 50 will be so energized that its movable contact member 56 is actuated into engagement with the contact member 60 to establish an energizing circuit for the winding 238 of the time delay relay 64. This circuit extends from the neutral conductor 54 through conductor 168, contact member 110 associated with the cam 90, conductor 240, contact member 110a associated with cam 90a, conductor 240a, the switch 164a, conductor 174, contact member 128 of master controller 116, conductors 176 and 178, contact member 154 of the controller 152, winding 238 of the time delay relay 64, fixed contact member 60 and movable contact member 56 of the primary relay 50 and conductors 180 and 184 to the closed switch 44.

When the winding 238 is thus energized, the contact member 244 of the time delay relay 64 is actuated to circuit closing position to establish an energizing circuit for the energizing winding 246 of the secondary relay 68. This circuit extends from the contact member 154 of the controller 152 through the contact member 244 of the time delay relay 64, conductors 248 and 250, energizing winding 246 of the secondary relay 68 and conductor 184 to the closed switch 44.

When the secondary relay 68 is thus energized, its contact member 252 is actuated to a circuit closing position to establish an energizing circuit for the winding 254 of the motor control relay 72. This circuit extends from the neutral conductor 54 through the conductor 198, energizing winding 254 of the relay 72, conductor 256, contact member 252 of the secondary relay 68 and conductor 184 to the closed switch 44. At the same time that the contact member 252 of the secondary relay 68 establishes the energizing circuit for the winding 254 of the relay 72, the signal circuit is established to indicate that the motor is conditioned for operation. This signal circuit extends from the neutral conductor 54 through the lamp 210, conductor 212, closed contact member 208 of the motor control relay 70, conductor 258, contact member 252 and conductor 184 to the closed switch 44.

When the motor control relay 72 is thus energized, its contact member 260 is actuated to a circuit closing position to establish an energizing circuit for the other winding of the motor 30 to effect an operation thereof. This energizing circuit for the motor 30 extends from the closed switch 44 through the conductors 184 and 214, contact member 260 of the motor control relay 72, conductor 262, the winding of the motor 30 and the closed switch 42 to the load conductor 32.

As the motor 30 is thus energized, it operates to effect a movement of the tap changing contact members 74 from one tap 28 to an adjacent tap 28a and at the same time operates the cams 76 and 78 to establish a holding circuit for the winding 254 of the motor control relay 72 and to effect a 90° movement of the Geneva gear 82 and the cams 84, 86, 88 and 90 associated therewith. As the cam 76 is actuated, its contact member 80 establishes the holding circuit which extends from the neutral conductor 54 through conductor 198 energizing the winding 254 of the relay 72, conductors 256 and 258, contact member 208 of the relay 70, conductor 212, contact member 80 and conductors 216 and 184 to the closed switch 44, thereby insuring that the motor will operate to effect a one-step change in the setting of the contact members 74.

The movement of the cam 78 actuates the Geneva gear 82 to effect a movement of the cams 84, 86, 88 and 90, whereby the contact members 110, 112 and 114 are actuated to their circuit opening position and contact members 104, 106 and 108 are actuated to a circuit closing position. The movement of the contact member 110 associated with cam 90 to open circuit position interrupts the energizing circuit for the time delay relay 64, and consequently for the motor control relay 70 when the motor has operated to move the tap changing contact members 74 one step. However, since contact member 106 associated with the cam 88 is now in a circuit closing position, it establishes a circuit which extends from the neutral conductor 54 through the contact member 126 of a controller 116, conductor 218, contact member 106 associated with the cam 88, contact member 122 of the controller 116, conductor 230, contact member 136a of the controller 116a, contact member 112a associated with the cam 90a, conductor 216a, contact member 138a of the controller 116a, conductor 250a, energizing winding 246a of the secondary relay 68a and conductor 184a to the closed switch 44a, whereby the secondary relay 68a is energized to actuate its contact member 252a to a circuit closing position.

When the secondary relay 68a is thus energized, its contact member 252a establishes a circuit which extends from the neutral conductor 54a through conductor 198a, the energizing winding 254a of motor control relay 72a, conductor 256a, contact member 252a of the secondary relay 68a and conductor 184a to the closed switch 44a to energize the motor control relay 72a to actuate its contact member 260a to a circuit closing position.

The motor control relay 72a thus establishes a motor energizing circuit for the motor 30a which extends from the switch 44a through conductors 184a and 214a, contact member 260a of relay 72a, conductor 262a and the energizing winding of the motor 30a to the closed switch 42a to effect an operation of the motor 30a to actuate the tap changing contact member 74a to move from one of the taps 28 to another. The operation of the motor 30a to move the tap changing contact members 74a also effects a movement of the cams 76a and 78a. The cam 76a again operates to effect a movement of the contact member 80a associated therewith to a circuit closing position to establish a holding circuit for the energizing winding 254a of the motor control relay 72a. This holding circuit extends from the neutral conductor 54a through conductor 198a, energizing winding 254a of the relay 72a, conductors 256a and 258a, contact member 208a of the relay 70a, conductor 212a, contact member 80a and conductors 216a and 184a to the closed switch 44a. It is, of course, to be understood that the signal circuit for the lamp 210a is also established when the secondary relay 68a is energized to actuate its contact member 252a to a circuit closing position, the signalling circuit extending from the neutral conductor 54a through the lamp 210a, conductor 212a, contact member 208a of the relay 70a, conductor 258a, contact member 252a of the secondary relay 68a and conductor 184a to the closed switch 44a.

As in previous instances, the movement of the Geneva gear 82a occasioned by operation of the motor 30a effects a predetermined simultaneous operation of the cams 84a, 86a, 88a and 90a with the result that contact members 110a, 112a and 114a are actuated to a circuit opening position, and contact members 104a, 106a and 108a are actuated to a circuit closing position.

If the change in the voltage across the load conductors occasioned by such operation of the tap changing contact members 74 and 74a is insufficient to effect the necessary reduction in the voltage across the load conductors, then the primary relay 50 of the unit 10 is maintained energized with its movable contact 56 in engagement with the fixed contact member 60, and since the contact members 104 and 104a are in circuit closing position, the time delay relay 64 is energized through a circuit extending from the neutral conductor 54 through conductor 168, contact member 104, conductor 232, contact member 104a, conductor 232a, the closed switch 164a, and from thence through the circuit previously described for effecting the energization of the winding 238 of the time delay relay 64. As the time delay relay 64 is thus energized to actuate its contact member 244 to a circuit closing position, the energizing winding 246 of the secondary relay 68 is again energized through the circuit extending from the neutral conductor 54 through conductor 168, contact member 104, conductor 232, contact member 104a, conductor 232a and the closed switch 164a and from thence through the circuit previously described. The energization of the relay 68 causes the relay 68 to operate to again effect the energization of the motor control relay 72 to again establish the energizing circuit for the motor 30 to effect an operation of the tap changing contact members 74.

Again the operation of the motor 30 also effects operation of the cams 76 and 78 to establish the holding circuit previously described for the energizing winding of the motor control relay 72 and to effect a simultaneous operation of the cams 84, 86, 88 and 90 through an angle of 90°, whereby the contact members 104, 106 and 108 are actuated to circuit interrupting positions and contact members 98, 100 and 102 are actuated to circuit closing positions. As in the previous case, the operation of the cams 84, 86, 88 and 90 effects an interruption of the energizing circuit for the winding of the time delay relay 64 and consequently an interruption of the energizing circuit of the energizing winding for the secondary relay 68 with the result that the motor will operate only so long as the holding circuit is maintained uninterrupted by the operation of the cam 76.

As soon as the cam 86 actuates its associated contact members into circuit closing positions, the contact member 100 associated therewith establishes an energizing circuit for the winding 246a of the secondary relay 68a of the unit 10a. This circuit extends from the neutral conductor 54 through the contact member 126 of controller 116, conductor 218, contact member 100, conductor 220, contact member 120 of the controller 116, conductor 222, contact member 134a of the controller 116a, contact member 106a associated with cam 88a, conductor 218a, contact member 138a of the controller 116a and from thence through the circuit previously described to effectively energize the windings 246a of the secondary relay 68a and effect a movement of its contact member 252a to a circuit closing position. With the secondary relay 68a energized in this manner, the motor control relay 72a is energized to establish the motor energizing circuits previously described to effect an operation of the motor 30a to actuate the tap changing contact members 74a to move from one of the taps 28a to another tap 28a in a direction to effect a decrease in the voltage across the load conductors supplied therefrom. Such operation of the motor 30a also effects a movement of the Geneva gear 82a in a direction to operate the cams associated therewith to effect a movement of the contact members 104a, 106a and 108a associated with the cam 88a to a circuit opening position and the contact members 98a, 100a, and 102a associated with the cam 86a to a circuit closing position.

Similar operations of the units 10 and 10a will be apparent if the primary relay 50 is still energized to demand an adjustment of the tap changing regulators 20 and 20a to effect a further decrease in the voltage across the conductors 32, 34 and 36, it being noted that the initial energizing circuit for the time delay relay 64 is effected through the circuit extending from the neutral conductor 54 through conductor 168, contact member 98 associated with cam 86, conductor 226, contact member 98a, conductor 226a and the closed switch 184a and from thence through circuits previously described to effect the energization of the time delay relay 64. The operation of the system has been described hereinbefore where such an energizing circuit has been established for the time delay relay. Under such energized conditions, the secondary relay 68 is also energized to effect the energization of the motor control relay 72 to effect an operation of the motor 30 in a direction to change the setting of the tap changing contact members 74 to effect a decrease in the voltage across the load conductors. Again the Geneva gear 82 is driven by operation of the motor 30 to effect an operation of the cams associated therewith to actuate the contact members 98, 100 and 102 to a circuit opening position and the contacts 92, 94 and 96 associated with the cam 84 to a circuit closing position.

Under such conditions of operation a circuit is established for the secondary relay 68a of unit 10a, the circuit extending from the neutral conductor 54 through the contact member 126 of controller 116, conductor 218, contact member 94 associated with cam 84, contact member 118, conductor 266, contact member 132a of the master controller 116a, contact member 100a associated with the cam 86a, conductor 218a to the contact member 138a of the controller 116a and from thence through the circuits previously described for effecting the energization of the winding 246a. As previously described, when the secondary relay 68a is thus energized, contact member 252a establishes an energizing circuit for the motor control relay 72a to thereby establish an energizing circuit for the motor 30a and effect the operation thereof to actuate the tap changing contact members 74a from one tap 28a to another tap 28a in a direction to decrease the voltage of the conductors supplied therefrom. At the same time the holding circuit for the motor control relay 72a is also energized by the operation of the motor 30a to effect a step operation of the motor and the Geneva gears 82a are driven to effect a 90° movement of the cams associated therewith, whereby the contact members 98a, 100a and 102a are actuated to circuit interrupting positions and the contact members 92a, 94a and 96a are actuated to circuit closing positions.

It is thus seen that where the units 10 and 10a or if additional units 10b, etc., are added to the system that by establishing the unit 10 as the master unit through suitable setting of a master controller 116 and the other as follower units by setting the controllers 116a, etc. thereof in position 2 as follower units, and closing the switch 164a of the last follower unit so as to provide a complete circuit when the corresponding contacts of corresponding cams 84 are in circuit closing position, that a positive lockout of the master unit is obtained until all of the follower units have been sequentially operated to adjust their tap changing contact members one step whereby the regulators are maintained not more than one step apart during an automatic regulating operation of the tap changing regulators. Further, by controlling the operating mechanism for tap changing motors in the manner described, it is seen that where all of the regulators are in step, the master unit only is operated initially to effect a change in the setting of its tap changing regulator. If one of the follower units is out of step, it may be brought back into step by operating that unit independently as will be explained more fully hereinafter. By maintaining all of the regulators not more than one step apart in this manner, it is seen that circulating currents will be reduced to a minimum and that there will be substantially no power loss as between the different regulators.

In the automatic regulating operation described hereinbefore, it was assumed that the unit 10 was the master unit and the unit 10a was the follower unit. If instead of such an arrangement it is desired to condition the unit 10a as the master unit and the unit 10 as the follower unit, then the controller 116a is moved so that the contact members of position 1 engage the corresponding fixed contact members and the controller 116 is moved to a position where the contact members corresponding to the position 2 thereof engage the fixed contact members associated therewith to thereby establish the unit 10a as the master unit and the unit 10 as the follower unit. For purposes of simplifying the description, only one step of the operation where the unit 10a is the master unit will be described.

Thus assuming that the tap changing regulators 20 and 20a are set and in step so as to maintain a given voltage on the load conductors if for some reason the voltage should decrease, then the primary relay 50a of the unit 10a is so energized as to actuate its contact member 56a into engagement with the contact member 58a. This establishes a circuit as described hereinbefore from the neutral conductor 54 of the tap changing unit 20 through the conductor 168, contact member 92 associated with cam 84, conductor 170, contact member 92a associated with cam 84a and conductor 170a, closed switch 164a, contact member 128a of the controller 116a, conductors 176a and 178a, contact member 154a, energizing winding 166a of the time delay relay 62a, contact members 58a and 56a of the primary relay 50a, conductor 180a and 184a to the closed switch 44a to effectively energize the time delay relay 62a. When the time delay relay 62a is energized and its contact member 188a is actuated to a circuit closing position, a circuit is established which extends from the contact member 154a of controller 152a through the contact member 188a, conductors 190a and 192a, the energizing winding 194a of the secondary relay 66a and conductor 184a to the closed switch 44a to effectively energize the secondary relay 66a. As the contact member 196a of the secondary relay 66a is actuated to its circuit closing position, it establishes the energizing circuit for the motor control relay 70a, as described hereinbefore, to effect an operation of the motor 30a to actuate the tap changing contact members 74a one step in a direction to increase the voltage across the load conductors supplied therefrom. At the same time, the cam 76a operates to establish the holding circuit so as to insure a one-step operation of the motor 30a, as described hereinbefore.

Simultaneously therewith, the Geneva gear 82a is driven to effect a movement of the cams 84a, 86a, 88a, and 90a to actuate the contact members 92a, 94a and 96a to a circuit interrupting position and to actuate the contact members 98a, 100a and 102a to a circuit closing position. The operation of the contact member 92a to a circuit interrupting position effectively interrupts the energizing circuits of the time delay relay 62a and the secondary relay 66a.

Since the contact member 100a is now in a circuit closing position, it effectively establishes a circuit which extends from the neutral conductor 54a through contact member 126a of the controller 116a, conductor 218a, contact member 100a associated with the cam 86a, contact member 120a of the controller 116a, conductor 222, contact member 134 of controller 116, contact member 96 associated with cam 84, conductor 224, contact member 140 of the controller 116, conductor 192, energizing winding 194 of the secondary relay 66 and conductor 184 to the closed switch 44 to thereby effectively energize the secondary relay 66 to actuate its contact member 196 to a circuit closing position. As the contact member 196 of the secondary relay 66 is thus actuated to circuit closing position, it establishes the energizing circuit for the motor control relay 70 as described hereinbefore to effectively establish an energizing circuit for the motor 30 to operate the motor 30 in a direction to actuate the tap changing contact members 74 one step in a direction to effect an increase in the voltage across the load conductors supplied therefrom. As described hereinbefore, the motor 30 is effective for actuating the cam 76 to establish the holding circuit for the motor control relay 70 and at the same time actuates the cam 78 to operate the Geneva gear 82 to move the cams 84, 86, 88 and 90 to effect a movement of the contact members 92, 94 and 96 to a circuit opening position and a movement of the contact members 98, 100 and 102 to a circuit closing position.

While only a one-step operation has been described with respect to conditions where the regulating unit 10a is established as the master unit and regulating unit 10 as the follower unit, it will be readily appreciated that further step operation of the two units will be effected in the same manner by suitably controlling the sequential operation of the cams associated with the Geneva gears 82a and 82 in response to operation of the motors 30a and 30, respectively, with which they are associated.

In all cases, the sets of contact members associated with the cams operated by the Geneva gears 82a and 82 are effective upon operation in a sequential manner for first locking out the master regulator unit and then effectively establishing circuits for effecting an operation of the follower unit and at all times to maintain such regulating operations within one step of one another.

The regulating system described has a further advantage that each of the tap changing regulators 20, 20a, etc., operates from one position to the next under the control of its own holding circuit and motor control relays so that any differences in the speed of the different tap changing units will not interfere with obtaining the proper paralleling operation. This will be especially appreciated when it is considered that the units are operated at all times within one step of each other. Further, as will be evident, there is no time delay between the operation of the master unit and the operation of the follower units once the motor for the master tap changer has been initiated for operation so as to effect an operation of the cams associated with the Geneva gear 82 or the like. While each unit is complete so that it can be operated independently of the other units which are connected for parallel control operation, all the units connected for the parallel control operation are controlled from one voltage regulating primary relay so that differences in the relay adjustments utilized with the different regulating units will not affect the parallel operation.

While the operation has been described with respect to an automatic regulating operation with the units all operating in parallel, it is, of course, to be understood that any one of the units may be operated independently of the other units either for automatic operation or for a manual control. For example, assume that it is desired to operate the regulating unit 10a independently of the regulating units 10 and 10b and still maintain regulator 10b as a follower for the regulating unit. In such case, the master controller 116 of the regulating unit 10 is maintained in the position previously described with the contact members of position 1 engaging the fixed contact members associated therewith to establish the regulating unit 10 as the master unit. The controller 116b (not shown) of the regulating unit 10b would then be positioned in the position 2 to establish the regulating unit 10b as a follower unit for operation, as described hereinbefore with respect to unit 10a when unit 10a was a follower unit for the master unit 10. The units 10 and 10b would then continue to function in the manner described hereinbefore with respect to units 10 and 10a.

However, in order to condition unit 10a for operation independently of the units 10 and 10b, the master controller 116a is then moved to a position where its contact members 142a, 144a, 146a, 148a and 150a in the No. 3 position engage the fixed contact members associated therewith to effectively short conductors 170a, 226a, 232a and 240a, so that operation of the cams 84a, 86a, 88a and 90a has no effect with regard to establishing or interrupting energizing circuits for the time delay relays 62 or 64. Thus it is seen that the contact members 142a, 144a, 146a and 148a function to by-pass contact members 92a, 98a, 104a and 110a with the result that operation of cams 84a, 86a, 88a and 90a has no effect on the operation of units 10 and 10b.

Under such conditions, the primary relay 50a of the unit 10a is responsive to the voltage across the conductors to actuate its movable contact member 56a into engagement with fixed contact members 58a or 60a depending upon whether or not it is desired to operate the motor 30a in a direction to raise or lower the voltage across the conductors 32a, 34a and 36a. Assuming, for example, that the primary relay 50a is energized in a direction to effect an increase in the voltage across the conductors then as the contact member 56a engages the contact member 58a, a circuit is established which extends from the neutral conductor 54a through the contact member 150a of the controller 116a, conductor 178a, contact member 154a, energizing winding 166a of the time delay relay 62a, contact members 58a and 56a, conductors 188a and 184a to the closed switch 44a. As the time delay relay 62a is energized to actuate its contact member 188a to a circuit closing position, it establishes a circuit extending from the neutral conductor 54a through the contact member 150a of the controller 116a through conductor 178a, contact member 154a of the controller 152a, contact member 188a of the time delay relay 62a, conductors 190a and 192a, energizing winding 194a of the secondary relay 66a and conductor 184a to the closed switch 44a to thereby energize the secondary relay 66a and actuate its contact member 196a to a circuit closing position. The energization of the secondary relay 66a thus effectively establishes the energizing circuit for the motor operating relay 70a, as described hereinbefore, to effect its operation to establish the energizing circuit for the motor 30a and thereby effect an operation of the motor 30a in a direction to drive the tap changing contact member 74a in a direction to effect an increase in the voltage across the load conductors. As in the previous operations described, as the motor 30a is operated, the cam 76a is effective for establishing the holding circuit for the motor control relay 70 so as to insure a one-step operation of the motor 30a before the energizing circuit therefor is interrupted.

If the energization of the primary relay 50a is such as to actuate its contact member 56a into engagement with the fixed contact member 60a, then a similar energizing circuit is established from the contact member 154a of the controller 152a through the energizing winding 238a of the time delay relay 64a to effect an operation of the time delay relay and actuate its contact member 244a into circuit closing position to establish a similar energizing circuit for the winding 246a of the secondary relay 68a. This latter circuit extends from the contact member 154a of the controller 152a through the contact member 244a of time delay relay 64a, conductors 248a and 250a and the energizing winding 246a of the time delay relay 68a to the conductor 184a to so energize the secondary relay 68a as to actuate its contact member 252a into circuit closing position. The secondary relay 68a is thus effective for establishing the energizing circuit for the motor control relay 72a as described hereinbefore to actuate its contact member 260a to circuit closing position to establish an energizing circuit for the motor 30a to operate the motor in a direction to actuate the tap changing contact members 74a one step in a direction to effect a decrease in the voltage across the load conductor supplied by the regulator 20a. As in the previous instances, the operation of the motor 30a effects an operation of the cam 76a to establish a holding circuit for the motor control relay 72a so as to insure a one-step operation of the motor 30a regardless of the demands of the primary relay 50a.

If instead of the independent automatic operation of the regulators hereinbefore described, it is desired to manually control the operation of one of the tap changing motors, for example motor 30a, such an operation may be obtained by moving the controller 152a to a position where its contact member 154a is out of contact engaging position with respect to its fixed contact members and the contact member 156a is actuated to a circuit closing position to engage its cooperating fixed contact members. The contact member 156a of the controller 152a is thus connected by a conductor 178a through the contact member 150a of the controller 116a to the neutral conductor 54a. The contact member 156a of controller 152a is also disposed to be connected by a conductor 268a to a center fixed tap on the manual operable controller 158a. Then by operating the manual controller 158a so as to selectively actuate its contact members 162a and 160a into engagement with the fixed contact members associated therewith, energizing circuits for the secondary relays 66a and 68a, respectively, are established.

Assuming, for example, that it is desired to manually control the operation of the tap changing regulator 20a in a direction to increase the voltage on the load conductors, then the controller 158a is moved to a position where the contact member 162a establishes a circuit which extends from the neutral conductor 54a through contact member 150a of the controller 116a, conductor 178a, contact member 156a of the controller 152a, conductor 268a, contact member 162a of the controller 158a, conductor 192a, energizing winding 194a of the secondary relay 66a and conductor 184a to the closed switch 44a. As the winding of the secondary relay 66a is thus energized, the contact member 196a of the relay is actuated to a circuit closing position to establish the energizing circuit for the motor control relay 70a in a manner described hereinbefore to thereby establish an energizing circuit for the motor 30a to effect the operation thereof in a direction to actuate the tap changing contact members 74a to effect an increase in the voltage across the load conductors. The holding circuit for the motor control relay 70a is also established by operation of the cam 76a as the motor 30a is operated, so that even though the controller 158a is actuated to a position where its contact member 162a interrupts the energizing circuit for the secondary relay 66a, nevertheless the motor 30a will be operated one complete step before its energized circuit is interrupted.

If it is desired to manually control the operation of the motor 30a to effect a decrease in the voltage across the load conductors supplied therefrom, then the controller 158a is manually operated to a position where its contact member 160a establishes a similar circuit extending from the neutral conductor 54a through contact member 150a, conductor 178a, contact member 156a of controller 152a, conductor 268a, contact member 160a of the controller 158a, conductor 250a, the energizing winding 246a of the secondary relay 68a and conductor 184a to the closed switch 44a. The secondary relay 68a when thus energized operates in a manner described hereinbefore to effect the energization of the motor control relay 72a to establish the motor energizing circuit and effect an operation thereof in a direction to actuate the tap changing contact members 74a in a direction to effect a decrease in the voltage across the load conductors supplied therefrom. Again the cam 76a is effective for establishing a holding circuit for the motor control relay 72a as described hereinbefore for maintaining the motor 30a energized to effect a one-step movement of the tap changing contact members 74a.

As will be appreciated, if it is desired to manually effect and control the step-by-step operation of the units connected in parallel, one of the units, such as unit 10, is selected as the master unit and the controller 116 is moved to position 1. The controller 152 is then moved to its manual operation position where the contact member 156 engages its associated fixed contact members to connect conductors 178 and 268. Then by moving the controller 158 to either the "lower" or "raise" position where its contact members 160 and 162, respectively, selectively establish the energizing circuits for windings 246 and 194, respectively, of the secondary relays 68 and 66, respectively, the motor 30 will be energized as described hereinbefore to effect operation of the tap-changing contact members 74. As the motor 30 is operated, cams 76 and 78 will be turned in a direction depending upon whether the change is a "lower" or "raise" to automatically lock out the master unit 10 and establish the energizing circuits for the sequential operation of the follower units 10a and 10b as described hereinbefore to effect the sequential step-by-step operation of the units and maintain the units not more than one step apart. Thus, it is seen that the sequential step-by-step operation of the bank of units, which are connected for parallel operation, can be manually controlled and effected as well as automatically controlled. Thus, even though the controller 158 is positioned in either the "raise" or "lower" position, after the motor 30 has effected a one-step operation of contact members 74, further operation of the motor 30 of unit 10 in the same direction is still dependent upon the follower action of the motors 30a, etc., effecting the sequential operation of the Geneva gears 82a, etc., to again establish the initial energizing circuit for the secondary relay 66 or 68 to thereby control the next step operation of the motor 30 and effectively lock out the motor 30 until after the motors 30a, etc., have sequentially effected a step-by-step operation of the regulator associated therewith.

While the independent operation of only one unit has been described hereinbefore, it will be apparent that where a bank of N numbered units are utilized any number of the units from 2 in number up to N in number may be automatically operated in parallel, or that part of the units may be operated in parallel and the remaining units may be operated independently of one another and independently of the paralleled units. The system is thus quite flexible in the control of the units.

I claim as my invention:

1. In a regulating system having a plurality of step type regulators connected in parallel circuit relationship for supplying a common load having a quantity to be regulated, the combination comprising, a load circuit, the step type regulators being electrically connected in parallel relationship to the load circuit, each of the parallel connected step type regulators comprising a primary relay connected to be responsive to the quantity to be regulated, a plurality of selective relays connected in circuit relationship in each step type regulator and disposed for selective operation by its corresponding primary relay, a plurality of secondary control relays connected in circuit relationship in each step type regulator disposed for selective operation by the primary relays respectively, a plurality of motor control relays connected in circuit relationship in each step type regulator disposed to be operated by the secondary control relays respectively, a motor connected in circuit relationship in each step type regulator disposed for operation in a predetermined direction in response to the selective operation of its corresponding primary relay, tap changer contact members disposed to be actuated by each motor to change the quantity to be regulated in accordance with the selective operation of the corresponding primary relay, a cam actuated switch mechanism disposed to be actuated by each motor, an electrical circuit connected to be controlled by the motor driven cam operated switch mechanism of one step type regulator for initiating the operation of a second of the parallel connected step type regulators independent of the primary relay of the second step type regulator to effect actuation of a corresponding second set of tap changer contact members, the second step type regulator being provided with an electrical circuit which after the actuation of the corresponding tap changer contact members functions to establish an actuating circuit for the operation of the motor of the first set of tap changer contact members thereby to effect a continuous operation for an equal number of steps of the sets of tap changer contact members in sequential order until interrupted by the operation of the primary relay of the first step type regulator to function, and a plurality of manually operated drum controllers disposed to be connected in circuit relationship in the parallel connected step type regulators to predetermine which step type regulator will function first and as a master regulator and the order of the other step type regulators as followers, one drum controller being provided for each step type regulator.

2. In a regulating system having a plurality of step type regulators connected in parallel circuit relationship for supplying a common load having a quantity to be regulated, the combination comprising, a load circuit, the step type regulators being electrically connected in parallel relationship to the load circuit, each of the parallel connected step type regulators comprising a primary relay connected to be responsive to the quantity to be regulated, a plurality of time delay relays connected in circuit relationship in each step type regulator and disposed for selective operation by its corresponding primary relay, a plurality of secondary control relays connected in circuit relationship in each step type regulator disposed for selective operation by the primary relays respectively, a plurality of motor control relays connected in circuit relationship in each step type regulator disposed to be be operated by the secondary control relays respectively, a motor connected in circuit relationship in each step type regulator disposed for operation in a predetermined direction in response to the selective operation of its corresponding primary relay, tap changer contact members disposed to be actuated by each motor to change the quantity to be regulated in accordance with the selective operation of the corresponding primary relay, a cam actuated switch mechanism disposed to be actuated by each motor, an electrical circuit connected to be controlled by the motor driven cam operated switch mechanism of one step type regulator for iniating the operation of a second of the parallel connected step type regulators independent of the primary relay of the second step type regulator to effect actuation of a corresponding second set of tap changer contact members, the second step type regulator being provided with an electrical circuit which after the actuation of the corresponding tap changer contact members functions to establish an actuating circuit for the operation of the motor of the first set of tap changer contact members thereby to effect a continuous operation for an equal number of steps of the sets of tap changer contact members in sequential order until interrupted by the operation of the primary relay of the first step type regulator to function, a plurality of manually operated drum controllers disposed to be connected in circuit relationship in the parallel connected step type regulators to predetermine which step type regulator will function first and as a master regulator and the order of the other step type regulators as followers, one drum controller being provided for each step type regulator, and manually operated switching means connected in electrical circuit relationship in each of the step type regulators for controlling the operation of the secondary motor control relays independent of the primary relays and the time delay relays.

3. In a regulating system having a plurality of step type regulators connected in parallel circuit relationship for supplying a common load having a quantity to be regulated, the combination comprising, a load circuit, the step type regulators being electrically connected in parallel relationship to the load circuit, each of the parallel connected step type regulators comprising a primary relay connected to be responsive to the quantity to be regulated, a plurality of selective relays connected in circuit relationship in each step type regulator and disposed for selective operation by its corresponding primary relay, a plurality of secondary control relays connected in circuit relationship in each step type regulator disposed for selective operation by the primary relays respectively, a plurality of motor control relays connected in circuit relationship in each step type regulator disposed to be operated by the secondary control relays respectively, a motor connected in circuit relationship in each step type regulator disposed for operation in a predetermined direction in response to the selective operation of its corresponding primary relay, tap changer contact members disposed to be actuated by each motor to change the quantity to be regulated in accordance with the selective operation of the corresponding primary relay, a cam actuated switch mechanism disposed to be actuated by each motor, a plurality of manually operated drum controllers disposed to be connected in circuit relationship in the parallel connected step type regulators to predetermine which step type regulator functions first and as a master regulator and the order of the other step type regulators as followers, one drum controller being provided for each step type regulator, means provided on each motor driven cam actuated switch mechanism cooperative with its corresponding drum controller for establishing electrical circuits in the parallel connected step type regulators for first locking out the master regulator and then establishing a motor actuating circuit in the follower step type regulator to effect an operation of the corresponding tap changer contact members after each operation of the tap changer contact members of the first operated step type regulator, an electrical circuit connected to be controlled by the motor driven cam operated switch mechanism of one step type regulator for initiating the operation of a second of the parallel connected step type regulators independent of the primary relay of the second step type regulator to effect actuation of a corresponding second set of tap changer contact members, the second step type regulator being provided with an electrical circuit which after the actuation of the corresponding tap changer contact members functions to establish an actuating circuit for the operation of the motor of the first set of tap changer contact members thereby to effect a continuous operation for an equal number of steps of the sets of tap changer contact members in sequential order until interrupted by the operation of the primary relay of the first step type regulator to function.

4. In a regulating system having a plurality of step type regulators connected in parallel circuit relationship for supplying a common load having a quantity to be regulated, the combination comprising, a load circuit, the step type regulators being electrically connected in parallel relationship to the load circuit, each of the parallel connected step type regulators comprising a primary relay connected to be responsive to the quantity to be regulated, a plurality of time delay selective relays connected in circuit relationship in each step type regulator and disposed for selective operation by its corresponding primary relay, a plurality of secondary control relays connected in circuit relationship in each step type regulator disposed for selective operation by the primary relays respectively, a plurality of motor control relays connected in circuit relationship in each step type regulator disposed to be operated by the secondary control relays respectively, a motor connected in circuit relationship in each step type regulator disposed for operation in a predetermined direction in response to the selective operation of its corresponding primary relay, tap changer contact members disposed to be actuated by each motor to change the quantity to be regulated in accordance with the selective operation of the corresponding primary relay, a cam actuated switch mechanism disposed to be actuated by each motor, a plurality of manually operated drum controllers disposed to be connected in circuit relationship in the parallel connected step type regulators to predetermine which step type regulator functions first and as a master regulator and the order of the other step type regulators as followers, one drum controller being provided for each step type regulator, means provided on each motor driven cam actuated switch mechanism cooperative with its corresponding drum controller for establishing electrical circuits in the parallel connected step type regulators for first locking out the master regulator and then establishing a motor actuating circuit in the follower step type regulator to effect an operation of the corresponding tap changer contact members after each operation of the tap changer contact members of the first operated step type regulator, an electrical circuit connected to be controlled by the motor driven cam operated switch mechanism of one step type regulator for initiating the operation of a second of the parallel connected step type regulators independent of the primary relay of the second step type regulator to effect actuation of a corresponding second set of tap changer contact members, the second step type regulator being provided with an electrical circuit which after the actuation of the corresponding tap changer contact members functions to establish an actuating circuit for the operation of the motor of the first set of tap changer contact members thereby to effect a continuous operation for an equal number of steps of the sets of tap changer contact members in sequential order until interrupted by the operation of the primary relay of the first step type regulator to function, and manually operated switching means connected in electrical circuit relationship in each of the step type regulators for controlling the operation of the secondary motor control relays independent of the primary relays and the time delay relays.

HERBERT L. PRESCOTT.

REFERENCES CITED

The following references are of record in the file of this patent:

UNITED STATES PATENTS

| Number | Name | Date |
| --- | --- | --- |
| 1,763,143 | Farley | June 10, 1930 |
| 1,909,068 | Oglesbee | May 16, 1933 |

FOREIGN PATENTS

| Number | Country | Date |
| --- | --- | --- |
| 12,051 of 1928 | Australia | Feb. 12, 1929 |